(12) United States Patent
Stevenson

(10) Patent No.: US 6,974,058 B2
(45) Date of Patent: Dec. 13, 2005

(54) LOAD CARRIER RACK

(76) Inventor: Robert Stevenson, P.O. Box 22518, Kansas City, MO (US) 64113-0518

( * ) Notice: Subject to any disclaimer, the term of this patent is extended or adjusted under 35 U.S.C. 154(b) by 0 days.

(21) Appl. No.: 10/875,542

(22) Filed: Jun. 24, 2004

(65) Prior Publication Data

US 2004/0262933 A1    Dec. 30, 2004

Related U.S. Application Data

(60) Provisional application No. 60/483,039, filed on Jun. 26, 2003.

(51) Int. Cl.[7] .................................................. B60R 7/00
(52) U.S. Cl. .................... 224/405; 296/3; 296/26.08; 224/403
(58) Field of Search ............................ 224/403, 405, 224/402, 542; 296/3, 57.1, 37.6, 61, 26.08, 296/50, 39.2, 51, 100.07, 180.1, 100.1; 410/110; 414/537, 462; 14/71.1

(56) References Cited

U.S. PATENT DOCUMENTS

| | | | |
|---|---|---|---|
| 3,593,865 A * | 7/1971 | Moor et al. .................. 414/563 |
| 4,057,281 A * | 11/1977 | Garrett ........................... 296/3 |
| 4,469,257 A * | 9/1984 | Parker .......................... 224/403 |
| 4,630,990 A * | 12/1986 | Whiting ....................... 224/405 |
| 4,854,628 A * | 8/1989 | Halberg .......................... 296/3 |
| 4,957,400 A * | 9/1990 | Karp .............................. 296/3 |
| 5,123,799 A * | 6/1992 | Breazeale .................... 414/462 |
| 5,316,190 A * | 5/1994 | Bullock .......................... 296/3 |
| 5,354,164 A * | 10/1994 | Goss et al. .................. 224/405 |
| 5,560,666 A * | 10/1996 | Vieira et al. .................... 296/3 |
| 5,836,635 A * | 11/1998 | Dorman .......................... 296/3 |
| 6,196,602 B1 * | 3/2001 | Esplin ............................ 296/3 |
| 6,213,530 B1 * | 4/2001 | Bohannon ................ 296/26.08 |
| 6,343,826 B2 * | 2/2002 | Bohannon ................ 296/26.08 |
| 6,457,619 B1 * | 10/2002 | Werner et al. .............. 224/405 |
| 6,644,704 B1 * | 11/2003 | Nyberg ........................... 296/3 |
| 6,652,205 B2 * | 11/2003 | Christensen ................ 410/100 |
| 6,726,073 B2 * | 4/2004 | Sutton ......................... 224/405 |
| 6,827,533 B2 * | 12/2004 | Cano-Rodriguez et al. . 410/128 |
| 2005/0117991 A1 * | 6/2005 | Anderson et al. ........... 410/104 |

* cited by examiner

Primary Examiner—Kiran B. Patel
(74) Attorney, Agent, or Firm—Mark Manley

(57) ABSTRACT

A load rack is for use in carrying long loads in a pickup truck having a bed and a tailgate. The rack can include a load bar supported by a left stance on one end and by a right stance on the other end. A footer section on each stance including a lower surface adapted to rest on the truck bed and a down turned portion extending below the lower surface to engage the space between the truck bed and tailgate.

5 Claims, 5 Drawing Sheets

LOAD CARRIER RACK

RELATED APPLICATIONS

Pursuant to 35 USC paragraph 119(e)(1) applicant claims priority of a provisional patent application Ser. No. 60/483,039 filed Jun. 26th, 2003

BACKGROUND OF THE INVENTION

It is common to need to carry loads in the bed area of a pickup truck. A common problem is that the bed of the truck is not long enough to accommodate a load. Long loads can include many materials commonly hauled by pickup such as lumber and pipe for example. One common solution is to haul a load with the tail gate of the truck open such that the load can extend beyond the bed area of the truck. This creates a problem where an item can fly off the truck bed. This can occur at a gust of wind or in traveling over a bumpy area such as a rail road track. This exposes the driver of the truck to problems not only concerning the actual loss of the load but also to liability associated with an accident that the lost load might cause.

Contractors commonly use pickup trucks to carry materials and tools to and from a job site. Another problem with loading material into the bed of a pickup is that if a person has a stack of lumber of various dimensions as well as hardware and tools, once everything is loaded into the truck bed it becomes necessary to unload everything in order to use anything.

It can be seen then that there is a need for an improvement in devices available to handle cargo in the bed of a truck.

SUMMARY OF THE INVENTION

The present invention is a rack for use in a pickup truck having a bed and a tailgate. The rack can include a load bar supported by a left stance on one end of the load bar and by a right stance on the other end of the load bar, a footer section on each stance including a lower surface adapted to rest on the truck bed and a down turned portion extending below the lower surface adapted to engage a space between the truck bed and the truck tailgate.

DETAILED DESCRIPTION OF THE DEVICE

Figure 1:
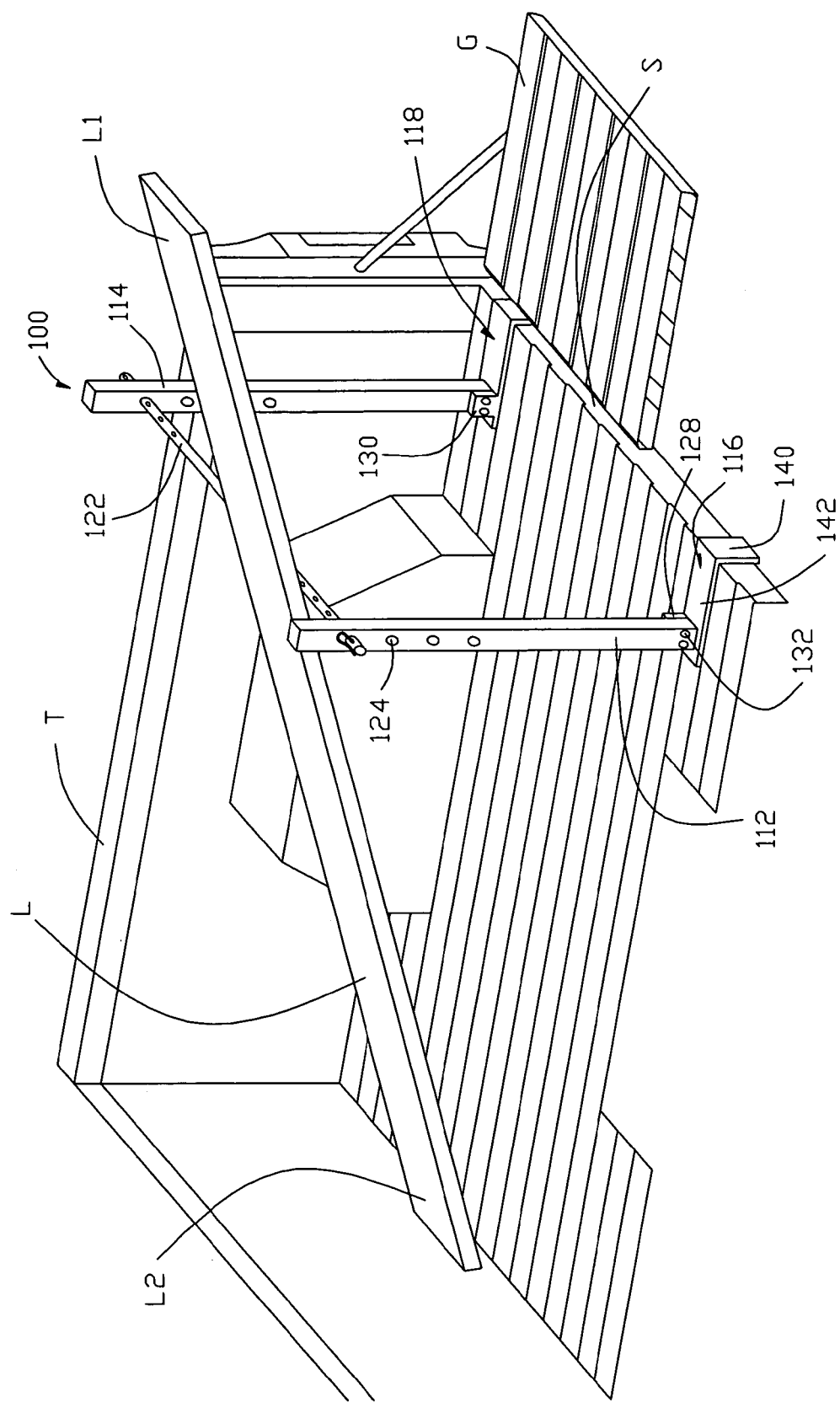
FIG. 1 Shows a view of the device in use.
Figure 3:
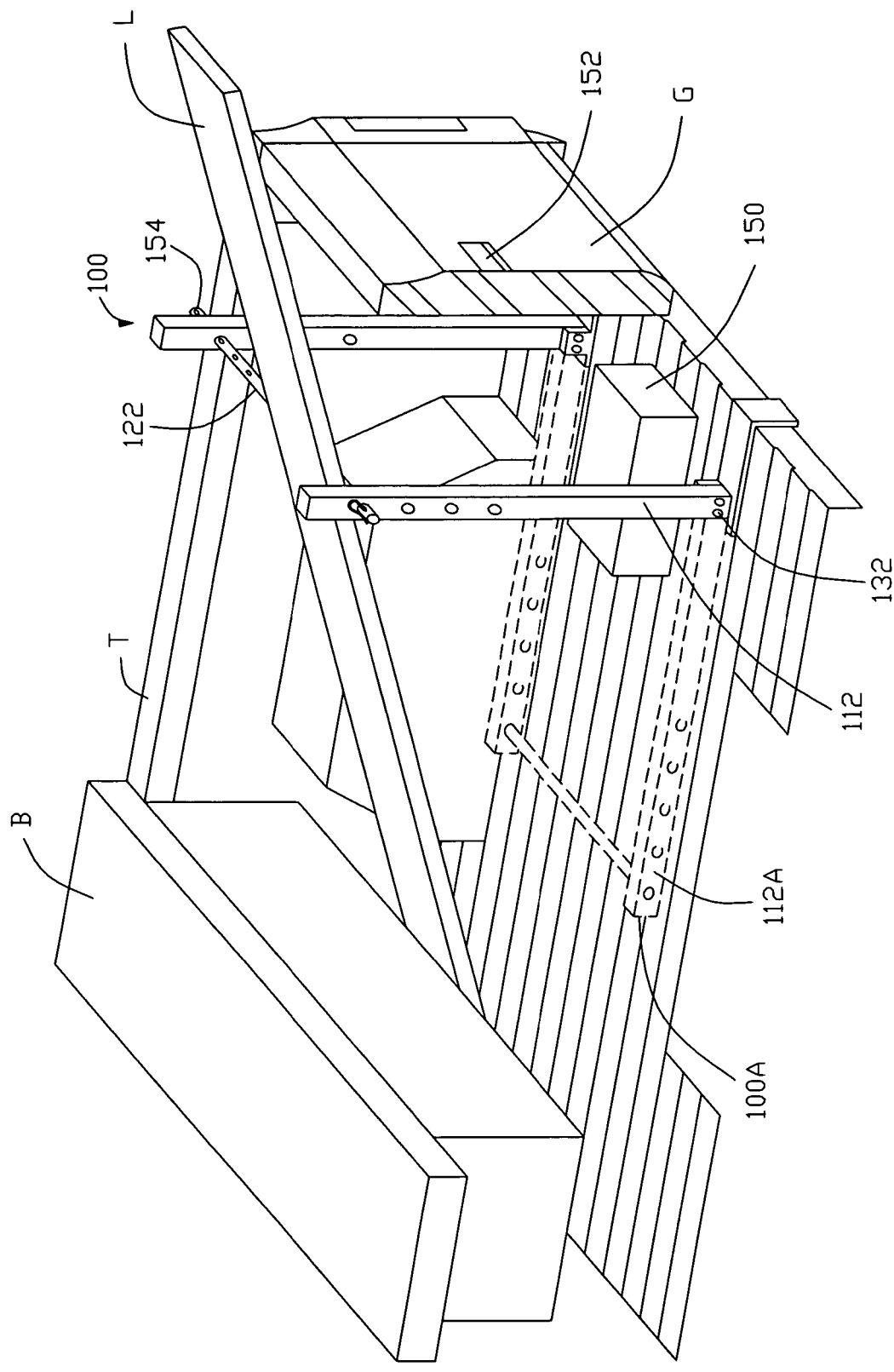
FIG. 3 Shows a second view of the device.

FIG. 1 shows a view of the rack 100 in use. FIG. 1 shows the bed of a truck T including a tail gate G shown in the open position. The device is shown with a load L in place. The load L is long having a first end L1 and a second end L2. In this case the load L is a piece of lumber that is too long to fit in the bed of the truck T with the tailgate G closed. In FIG. 1 the tailgate G is shown in the open position, FIG. 3 shows that the tailgate can be closed without moving the load L.

The rack 100 includes a left stance 112 and a right stance 114. The left stance 112 can include a left footer 116 and the right stance 114 can include a right footer 118. A load bar 122 spans the space between the left stance 112 and the right stance 114. The load bar 122 is mounted in holes 124 in each stance 112,114. There can be a plurality of holes 124 in each stance 112,114 allowing for some vertical adjustment to the position of the load bar 122. Experimentation has shown that the height of tailgates G in most truck are fairly standard, so height adjustment to the load bar 122 is usually not required even if the device 100 is moved from one truck bed to another.

FIG. 1 shows the stances 112,114 pinned to the footers 116, 118 using mounting flanges 128,130 and pins 132. The pins 132 can be self locking or can include a cotter key 160 or other device, shown in FIG. 4, to prevent the pin 132 from slipping out. A down turned portion 140 on each footer 112, 114 fits in the existing space S between the bed of the truck T and the tailgate G. The down turned portion 140 would normally be at a 90 degree angle A, shown in FIG. 4, to the bed portion 142 of the footer 112, 114. Experimentation has shown that the space S is plenty wide to accommodate the down turned portion 140 in virtually all truck beds with tailgates G. The down turned portion 140 needs to be long enough to engage the space S such that the bed and tailgate G will prevent the rack 100 from sliding forward or back, a length in the range of 1 to 3 inches has been found to be ideal. The footers 116, 118 serve as anchors that prevent the rack 100 and load L from shifting when the truck T is in motion. The footers 116,118 prevent the load rack 100 from bouncing up and down when the truck T is in motion. The footers 116,118 provide these benefits if the tailgate G is open or closed, so even with the tailgate G open the load L cannot shift backwards because of the down turned portion 140.

A significant advantage of the rack 100 is that it provides a stable load rack but does not require any mountings permanently attached to the truck T. Because the stances 112, 114 are free standing, that is to say unattached to the truck T, the rack 100 can be removed from the bed of the truck T simply by picking it up. The footers 116, 118 can only sit in place. This provides real flexibility for the truck user who may want to use the truck for applications where the load rack 100 is not needed. Alternatively with contractors who run crews and may have several trucks on a job site, the rack 100 can be moved from one truck to another with ease. A significant advantage of the rack 100 is that it will work in a bed of a truck T with or without a bed liner (not shown).

Figure 2:
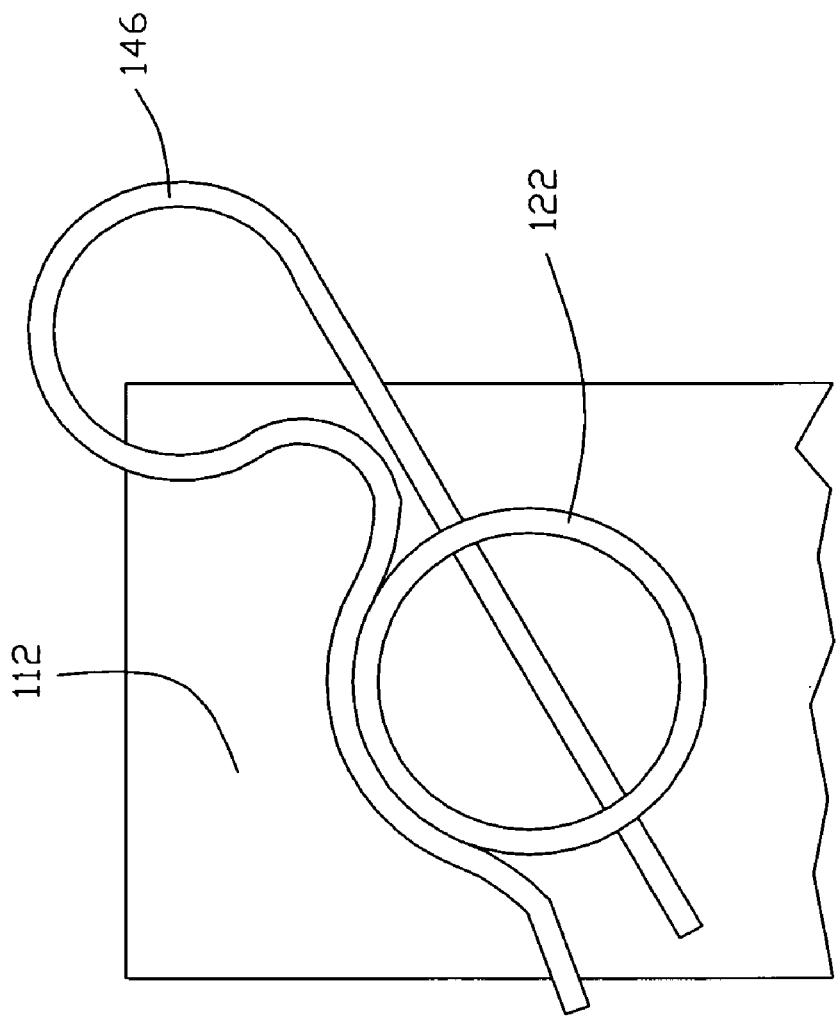
FIG. 2 Shows a detailed view of a portion of the device.

FIG. 2 shows details of the rack 100. The left stance 112 has the end of the load bar 122 passing through it. A pin 146 can be used to hold the load bar 122 in place. It will be understood that a pin 146 can also be used at the other end of the load bar 122 where it passes through right stance 114.

FIG. 3 shows details of the rack 100 in use. In this view a tool box B has been added to the bed of the truck T. Tool boxes B are very popular with contractors and are often placed in the bed of the truck T opposite the tailgate G. As can be seen the end of the long load L can still slip in under the tool box B allowing full use of the bed of truck T. FIG. 3 shows the tailgate G in the closed position and as can be seen the height of load bar 122 is sufficient to hold the load L above the tailgate G. This prevents damage to the top of the tailgate G from the load bouncing on it. Also if the load were positioned to rest on the top of tailgate G, which is commonly done, the gate latch mechanism 152 can pop open causing the tailgate G to open and the load to fall out. As can be seen in FIG. 3, an item 150 can still be placed in the bed of the truck T under the load L. Thus, for example a contractor can have a tool box, shorter parts or other items 150 in the bed of the truck T and these items 150 can be removed from the bed of the truck T independently of the load L.

FIG. 3 also shows the device 100 in a second position 100a shown in dashed lines. Removing a pin 132 from each stance 112,114 allows the stances 112, 114 and load bar 122 to pivot about the remaining pin 132 to be laid in position 100a for storage when not in use. As mentioned earlier the rack 100 can also simply be lifted out of the bed of the truck T for storage.

Figure 4:
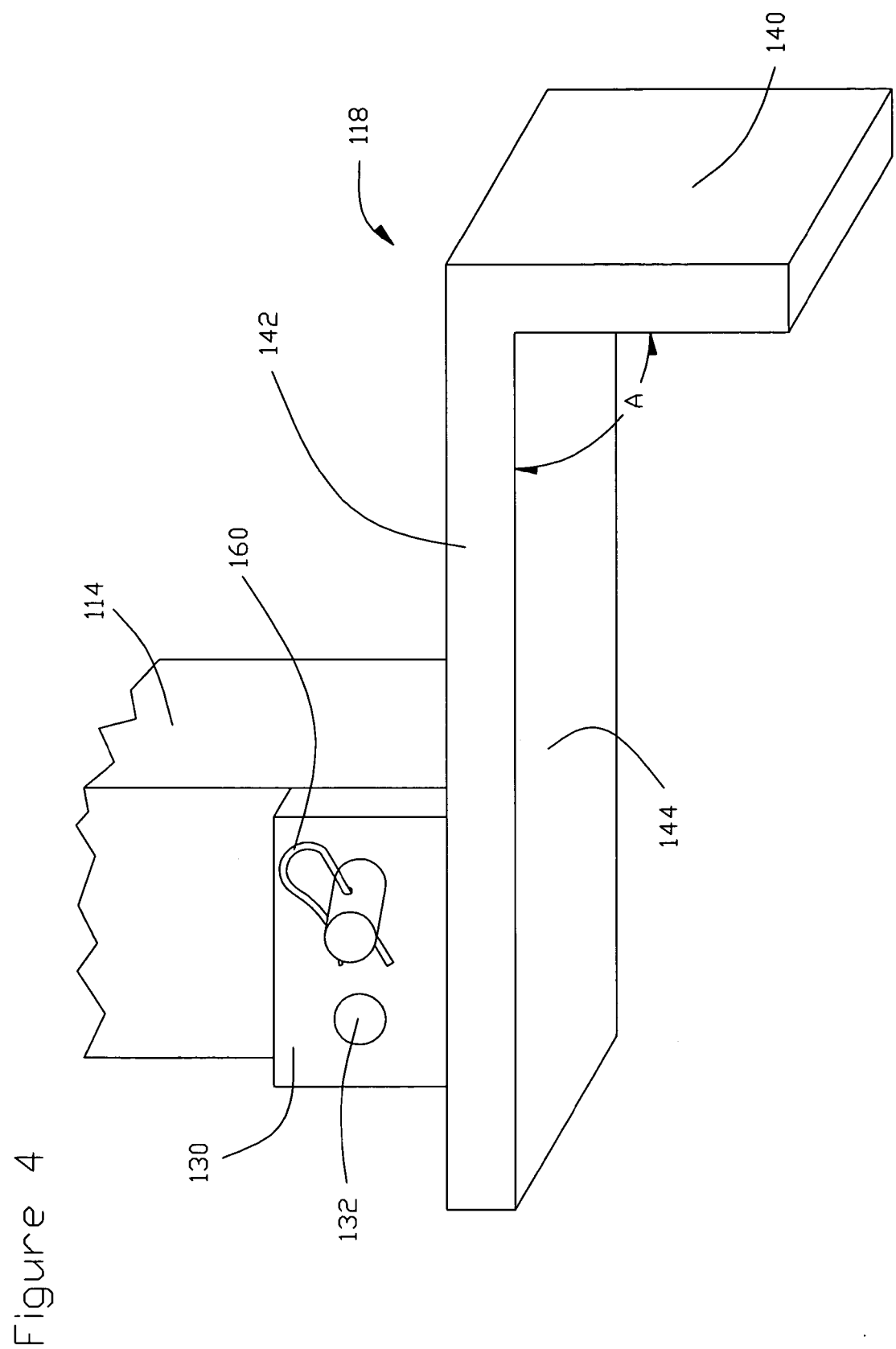
FIG. 4 Shows details of the footer.

FIG. 4 shows details of the footer 118 which includes the down turned portion 140. The bed portion 142 of the footer 118 includes a lower surface 144 that will rest on the bed surface of the truck T. The Bed portion 142 forms an angle A with the down turned portion 140. The angle A can be a 90 degree angle. FIG. 4 shows that the mounting flange 130 can be attached to the stance 114 using two pins 132. Those pins 132 can be In use the rack 100 can be placed in the bed of the truck T for use. No fasteners are required. For simplicity the tailgate G of the truck T can be placed in the open position such that the space S shown in FIG. 1 is visible. Downturns 140 are placed in the space S. The rack 100 is light enough to place in the bed of the truck T as one piece or it can be assembled in place by first placing the footers 116 and 118 in place on the bed of the truck T with downturns 140 in space S. The left and right stance 112,114 can then be pinned to the footers 116,118 using the pins 132 and cotter keys 160. Then the load bar 122 can be slid through holes 124 and held in place with pins 146 which fit through holes 154 in each end of load bar 122. Long loads L can then be placed in the bed of the truck T with an end of the load L1 resting on the load bar 122. The bar 122 can be positioned such that the an end of load L1 is above the tailgate G in its closed position, while the other end of load L2 rests on the bed of the truck T. Though shown with the footers 116,118 as separate pieces pinned to the stances 112, 114 the footers could be welded or attached by any means to the stances.

Figure 5:
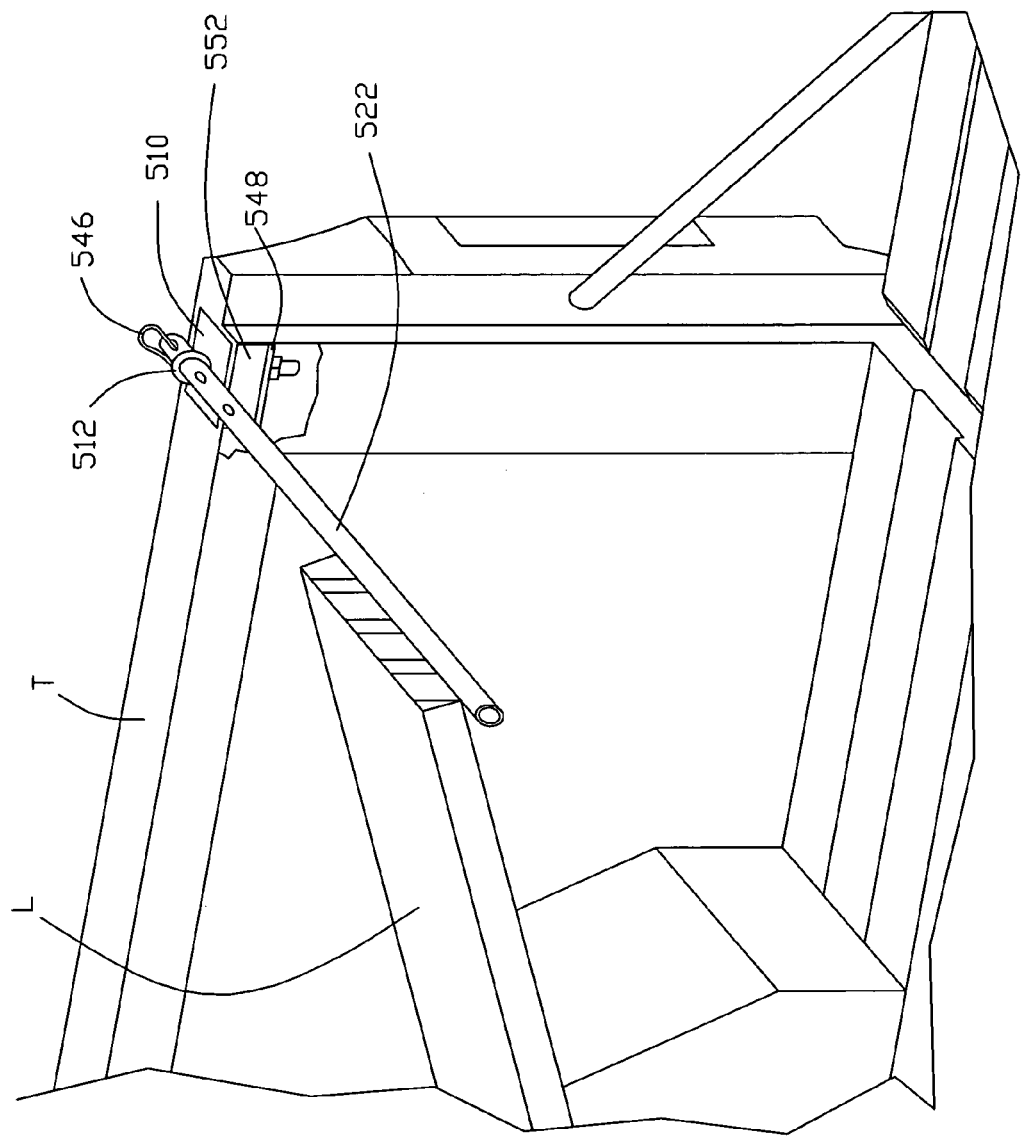
FIG. 5 Shows an alternate embodiment of the device.

FIG. 5 discloses an alternate embodiment 500 using the openings 510 commonly placed on the upper end of the fenders of the bed of the truck T. An eye bolt 512 can serve both to clamp to an opening 510 and to provide an eye through which load bar 522 can pass. The clamp 548, shown in the section cut away, can be a threaded plate and rubber friction fit mechanism that expands in the opening 510 as the eye bolt 512 is tightened to attach to opening 510. The eye bolt 512 can provide height adjustment for the load bar 522. The clamp 548 and eye bolt 512 engaging the opening 510 prevent the load bar 522 from shifting. It will be understood by those skilled in the art that a variety of arrangements could be used to adjustably support the load bar 522 from the holes 510.

What is claimed is:

1. A rack for use in a pickup truck having a bed and a tailgate, said rack including a load bar supported by a left stance on one end of said load bar and by a right stance on the other end of said load bar, a footer section on each said left and said right stance said footer section including a lower surface adapted to rest on said bed and a down turned portion extending below said lower surface.

2. The rack as disclosed in claim 1 wherein said down turned section is generally at a 90 degree angle to said lower surface.

3. The rack as disclosed in claim 1 wherein each said stance is pinned to each said footer and wherein the removal of a pin allows each said stance and said load bar to pivot to a position laying flat on said bed.

4. A rack for use in a truck having a bed and tailgate, said rack including a load bar supported by a first stance on one end of said load bar and by a second stance on the other end of said load bar, a footer section on each said stance, said footer section including a lower surface adapted to rest on said truck bed and a down turned portion extending below said lower surface and adapted to fit in a space between the truck bed and the tailgate to prevent movement of said rack.

5. The rack of claim 4 wherein each said stance includes pivot means that allow said load bar to pivot from a load support position to a storage position on the truck bed.

* * * * *